United States Patent Office 2,760,083
Patented Aug. 21, 1956

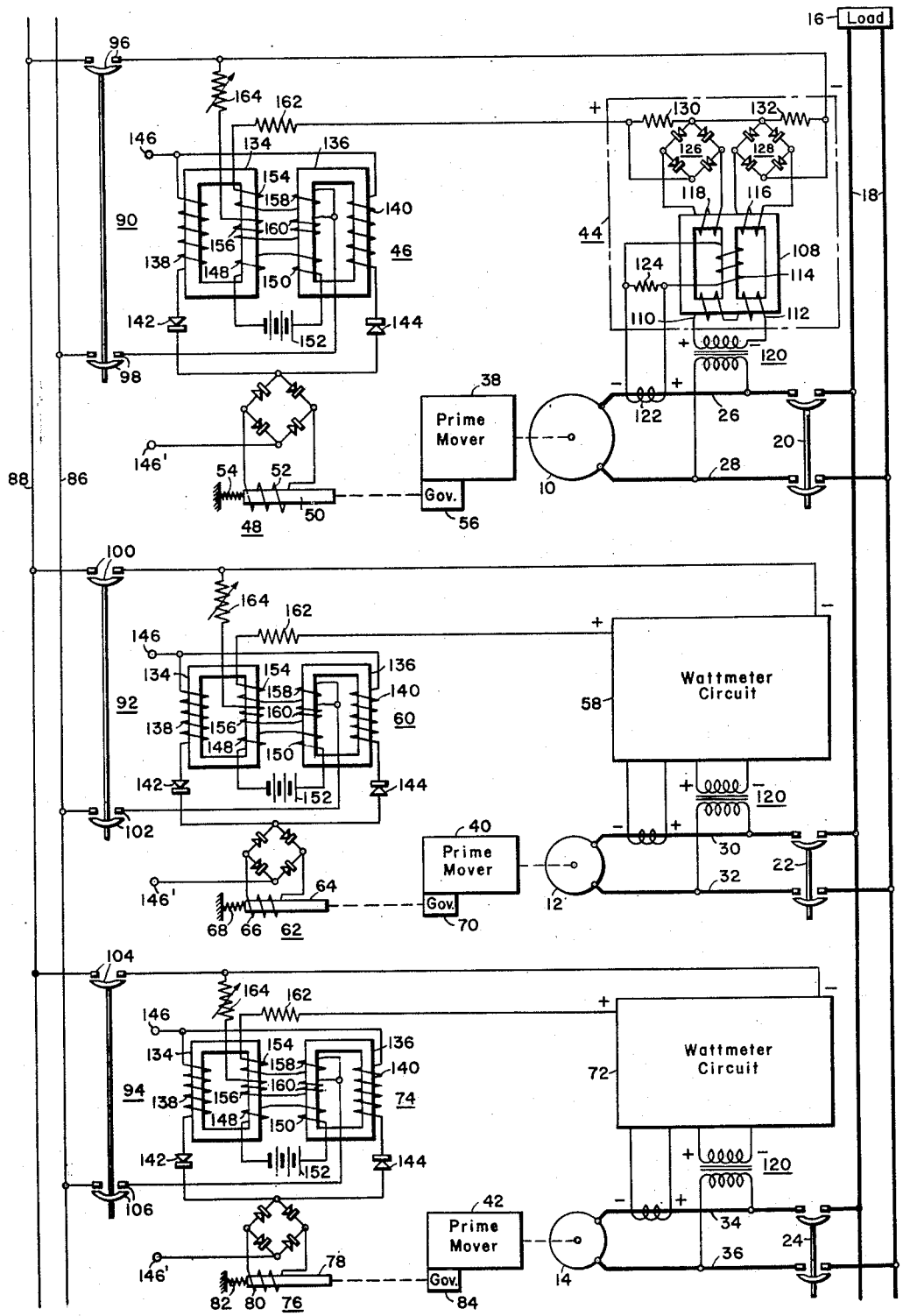

2,760,083

CONTROL CIRCUIT

Frank J. Rau, Pittsburgh, and Kenneth Losch, Penn Township, Allegheny County, Pa., assignors to Westinghouse Electric Corporation, East Pittsburgh, Pa., a corporation of Pennsylvania Application December 8, 1954, Serial No. 473,925

6 Claims. (Cl. 307—57)

This invention relates to control circuits and, more particularly, to means for maintaining a proper load division between a plurality of generators connected in parallel to a common load.

In order to properly divide the total load on a system between a plurality of generators feeding the system, it is necessary to compare the load on each generator to the desired portion of the total load on the system. This comparison requires some means of measuring the load on each generator, and some means of measuring the total load on the system. In conventional load division systems, a wattmeter circuit is used to measure the output of each generator, and an additional wattmeter circuit is used to measure the total load on the system. The wattmeter circuit which measures the total load must be placed on the system at a point on the bus which carries the total load. Many systems, however, have the load spread out along the bus in such a manner that no one point on the bus carries the total load. Measurement of the total load then becomes more difficult and usually requires additional wattmeter circuits.

Heretofore, apparatus has been provided which does not require additional wattmeter circuits for obtaining a measurement of the total load; however, these prior art control systems cannot readily be adapted to maintain a proper load division between a plurality of alternators connected in parallel to a common load.

A broad object of this invention is to provide for maintaining a proper load division between a plurality of machines connected in parallel to a common load.

A more specific object of this invention is to provide for comparing a voltage measure of the power output of a generator with a voltage measure of the power output of another generator connected in parallel with the first generator, to thereby obtain an error signal for maintaining a proper load division between the parallel connected generators.

Another specific object of this invention is to provide for so disposing and interconnecting control windings of a magnetic device responsive to a measure of the load on a generator with the corresponding control windings of another magnetic device responsive to a measure of the load on another generator, connected in parallel with the first generator, that when the load on one of the generators increases to a value above its preset share, its load is decreased and the load on the other generator is increased, to thereby maintain a proper division of the load between the generators.

Another object of this invention is to provide a paralleling system which compensates for the speed droop of each of a plurality of parallel connected generators and also simultaneously maintains a proper load division between each of the parallel connected generators.

Other objects of this invention will become apparent from the following description when taken in conjunction with the accompanying drawing the single figure of which is a diagrammatic showing illustrating this invention.

Referring to the drawing, this invention is illustrated by reference to three alternating-current generators 10, 12 and 14, which are disposed to be connected in parallel to a common load 16 through a load bus 18. Since the generators 10, 12 and 14 must be synchronized before being connected in parallel to the common load 16, line breakers 20, 22 and 24 are provided. When the line breakers 20, 22 and 24 are in the circuit-closed position, line conductors 26 and 28, 30 and 32, and 34 and 36 supply energy to the load bus 18. In this instance, each of the generators 10, 12 and 14 are driven by separate prime movers 38, 40 and 42, respectively.

In general, the control apparatus for the generator 10 comprises a load-sensing or wattmeter circuit 44, responsive to a measure of the output current and output voltage of the generator 10, for producing at its output a voltage proportional to the real power output of the generator 10, and thus proportional to the load on the generator 10 and on the prime mover 38; a full-wave, doubler-type, self-saturating magnetic amplifier 46, responsive to the output voltage of the load-sensing network 44; and a relay 48 comprising an armature 50, an operating coil 52, and a compression biasing spring 54, for controlling the operation of a governor 56, to thereby control the speed of the prime mover 38, and thus the load on the generator 10 when it is connected in parallel with the generators 12 and 14.

Similarly, the control apparatus for the generator 12 comprises a load-sensing network or wattmeter circuit 58 for producing at its output a voltage proportional to the real power output of the generator 12 and thus a voltage proportional to the load on the generator 12 and on the prime mover 40; a full-wave, doubler-type, self-saturating magnetic amplifier 60, responsive to the output voltage of the load-sensing network 58; and a relay 62 comprising an armature 64, an operating coil 66, and a compression biasing spring 68, for controlling the operation of a governor 70 which, in turn, controls the speed of the prime mover 40, and thus the load on the generator 12 when it is connected in parallel with the generators 10 and 14.

The control apparatus for the generator 14 also comprises a load-sensing network or wattmeter circuit 72 for producing at its output a voltage proportional to the real power output of the generator 12 and thus a voltage proportional to the load on the generator 14 and on the prime mover 42; a full-wave, doubler-type, self-saturating magnetic amplifier 74, responsive to the output voltage of the load-sensing network 72; and a relay 76 comprising an armature 78, an operating coil 80, and a compression biasing spring 28, for controlling the operation of a governor 84 which, in turn, controls the speed of the prime mover 42, and thus the load on the generator 14 when it is connected in parallel with the generators 10 and 12.

In practice, the magnetic amplifiers 46, 60 and 74 are identical, and, therefore, in order to simplify the description, like components of these magnetic amplifiers have been given the same reference characters. Also, in practice, the wattmeter circuits 44, 58 and 72 are identical, and in order to simplify the description, the like components associated with these wattmeter circuits have been given the same reference characters.

In order to connect the control circuits for the generators 10, 12 and 14 in circuit relationship with one another, so as to obtain a proper division of the load between the generators 10, 12 and 14, a paralleling bus comprising conductors 86 and 88, and line breakers 90, 92 and 94 comprising contact members 96 and 98, 100 and 102, and 104 and 106, respectively, are provided. Thus, in operation, when the line breakers 90, 92 and 94 are in the circuit-closed position, the control circuits of the generators 10, 12 and 14 are interconnected, to thereby obtain a proper division of the load between the generators 10, 12 and 14, as will be explained more fully hereinafter.

In this instance, the load-sensing circuits 44, 58 and 72 are such as to be capable of responding to the output current and voltage of an alternating-current generator. However, it is to be understood that this invention is equally applicable to the paralleling of direct-current generators (not shown), in which case suitable direct-current load-sensing networks (not shown) would be utilized, and to the paralleling of prime movers driving a common mechanical load if suitable load measuring devices are employed such as strain gages on the output shafts of the prime movers.

As shown, the load-sensing network 44 comprises a three-legged magnetic core member 108, having disposed in inductive relationship therewith reference windings 110 and 112, a control winding 114, and output windings 116 and 118. In practice, the reference windings 110 and 112 are provided with an equal number of turns and are connected in series-aiding relationship. The reference voltage as received from the line conductors 26 and 28 is applied to the reference windings 110 and 112 through a potential transformer 120. On the other hand, the control voltage or signal is applied to the control winding 114. In particular, a current transformer 122 is so disposed as to obtain a measure of the output current of the generator 10, and a resistor 124 is connected across the current transformer 122 so that a voltage is produced across the resistor 124 which is proportional to the line current. This voltage appearing across the resistor 124 is then applied to the control winding 114 by connecting it across the resistor 124.

When the polarity of the voltages across the outputs of the potential and current transformers 120 and 122 is as shown in the drawing, the flux linking the output winding 118 is the vector sum of the flux produced by the current flow through the reference winding 110 and the flux produced by the current flow through the control winding 114. On the other hand, the flux linking the output winding 116 is the vector difference of the flux produced by the current flow through the reference winding 112 and the flux produced by the current flow through the control winding 114.

In order to rectify the voltages induced in the respective output windings 118 and 116 by the resultant fluxes linking these output windings, full-wave, dry-type rectifiers 126 and 128, respectively, are provided. In particular, the input terminals of the rectifier 126 are connected to the output winding 118, while the output terminals of the rectifier 126 are connected to a loading resistor 130. Similarly, the input terminals of the rectifier 128 are connected to the output winding 116, while the output terminals of the rectifier 128 are connected to a loading resistor 132. In order to obtain the difference in the voltages appearing across the loading resistors 130 and 132, these loading resistors are connected in series circuit relationship, as illustrated in the drawing.

In this instance, each of the magnetic amplifiers 46, 60 and 74 comprises two rectangular magnetic core members 134 and 136, which have disposed in inductive relationship therewith load windings 138 and 140, respectively. In order to obtain self-saturation for the magnetic amplifier 46, self-saturating rectifiers 142 and 144 are connected in series circuit relationship with the load windings 138 and 140, respectively, the rectifiers 142 and 144 being poled oppositely from one another. In operation, the load windings 138 and 140 receive energy from the terminals 146 and 146', which have applied thereto a suitable alternating-current supply voltage.

For the purpose of biasing the magnetic amplifier 46 to approximately half output, bias windings 148 and 150 are disposed in inductive relationship with the magnetic core members 134 and 136, respectively. As illustrated, the bias windings 148 and 150 are connected in series circuit relationship with one another, the series circuit being connected across a suitable source of direct-current voltage 152. In practice, the current flow through the bias windings 150 and 148 produces magnetomotive forces that oppose the respective magnetomotive forces produced by the current flow through the associated load windings 140 and 138, respectively.

In accordance with the teachings of this invention, control windings 154 and 156 are disposed in inductive relationship with the magnetic core member 134, and control windings 158 and 160 are disposed in inductive relationship with the magnetic core member 136. As illustrated, the control windings 154, 158, 160 and 156 are connected in series circuit relationship with one another and with a resistor 162 and with a variable resistor 164, the series circuit being connected across the loading resistors 130 and 132. Thus, the control windings 154, 156, 158 and 160 are responsive to the magnitude of the output voltage of the load-sensing network 44. In practice, the resistor 162 functions to reduce the time delay of the magnetic amplifier 46. On the other hand, as will be explained more fully hereinafter, the variable resistor 164 is provided so that the proportion of the load taken by the generator 10 can be varied.

The control windings 156 and 160 are so disposed on their respective magnetic core members 134 and 136, and so interconnected with the output of the load-sensing network 44, that current flow therethrough produces magnetomotive forces that aid the magnetomotive forces produced by the current flow through their associated load windings 138 and 140. On the other hand, the control windings 154 and 158 are so disposed on their respective magnetic core members 134 and 136, and are so interconnected with the output of the load-sensing network 44, that current flow therethrough produces magnetomotive forces that oppose the magnetomotive forces produced by the current flow through their associated load windings 138 and 140. By providing the control windings 154 and 158 in addition to the control windings 156 and 160, the magnetic amplifiers 46, 60, and 74 control the governors 56, 70 and 84, respectively, to tend to decrease the speed of their associated generator when its load increases to a value above that called for by the settings of the resistors 162, thereby reapportioning the total load 16 on the generators 10, 12 and 14 by decreasing the load on the generator taking more than its share of the total load 16 and increasing the load on the generators taking less than their share of the total load 16. This will be explained more fully hereinafter.

In order to compensate for speed droop due to an increase in the load on the generators 10, 12 and 14, the control windings 156 and 160 have a greater number of turns than the associated control windings 154 and 158. In practice, it has been found satisfactory to provide twice as many turns for the control windings 156 and 160 as compared to the control windings 154 and 158.

The operation of the apparatus illustrated in the drawing will now be described. However, before putting the apparatus into operation, it is necessary to synchronize the generators 10, 12 and 14 and then close the line breakers 20, 22 and 24. Then, in order to interconnect the control circuits for the generators 10, 12 and 14, the circuit breakers 90, 92 and 94 are actuated to the circuit-closed position, whereby the control circuits are able to maintain a proper division of the load between the generators 10, 12 and 14. For purposes of description, it will be assumed that the variable resistors 164 associated with the magnetic amplifiers 46, 60 and 74 are so adjusted that the total load 16 is evenly divided between the generators 10, 12 and 14.

With the resistors 164 adjusted as hereinbefore described, and with each of the generators 10, 12 and 14 taking its proper share of the load, all of the output current of the load-sensing networks 44, 58 and 72 flows from the respective left ends of the loading resistors 130, through the respective resistors 162, the respective control windings 154, 158, 160 and 156, and the respective variable resistors 164, to the right ends of the loading resistors 132. Such being the case, if speed droop occurs due to an increased loading on the generators 10, 12 and 14, the output currents of the load-sensing networks 44, 58 and 72 increase, to thereby increase the magnitude of the current flow through the various control windings 154, 158, 160 and 156 of the magnetic amplifiers 46, 60 and 74. Since the control windings 156 and 160 have a greater number of turns than the control windings 154 and 158, the increased current flow through the control windings effects an increase in the magnitude of the magnetomotive force aiding the magnetomotive force produced by the current flow through the associated load windings 138 and 140, and, therefore, decreases the impedance of the load windings 138 and 140. Such an action increases the magnitude of the output of the respective magnetic amplifiers 46, 60 and 74, to thereby effect an operation of the respective governors 56, 70 and 84 in such a direction as to increase the speed of the respective prime movers 38, 40 and 42, to thus increase the speed of the respective generators 10, 12 and 14, and thereby prevent speed droop of the generators 10, 12 and 14.

Now let us consider the case in which the generator 10 assumes a greater proportion of the total load 16 than it should. With the circuit breakers 90, 92 and 94 in the circuit-closed position, circuits are provided for connecting the series circuit including the variable resistor 164 and the control windings 156 and 160 of the magnetic amplifier 46 in parallel circuit relationship with the corresponding series circuits of the magnetic amplifiers 60 and 74. Thus, the voltages across these parallel connected series circuits are compared, and as hereinbefore mentioned, the voltage across each of these series circuits, including the variable resistor 164 and the control windings 156 and 160, is proportional to the load on its associated generator. Therefore, assuming the generator 10 takes a greater share of the total load 16 than it should, then current flows from the control winding 160 of the magnetic amplifier 46 through the contact members 98 of the circuit breaker 90, the conductor 86, the contact members 102 of the circuit breaker 92, the control windings 160 and 156 of the magnetic amplifier 60, the variable resistor 164 of the magnetic amplifier 60, the contact members 100 of the circuit breaker 92, the conductor 88, and the contact members 96 of the circuit breaker 90, to one end of the variable resistor 164 of the magnetic amplifier 46.

Under such assumed conditions when the generator 10 is taking more than its share of the load 16, current also flows from the control winding 160 of the magnetic amplifier 46, through the contact members 98 of the circuit breaker 90, the conductor 86, the contact members 106 of the circuit breaker 94, the control windings 160 and 156 of the magnetic amplifier 74, the variable resistor 164 of the magnetic amplifier 74, the contact members 104 of the circuit breaker 94, the conductor 88, and the contact members 96 of the circuit breaker 90, to the same end of the variable resistor 164 of the magnetic amplifier 46. Such being the case, the current flow through the control windings 160 and 156 of the magnetic amplifier 60 effects a decrease in the impedance of the associated load windings 140 and 138, respectively, to thereby increase the magnitude of the output of the magnetic amplifier 60, to thus effect an operation of the governor 70 in such a direction as to tend to increase the speed of the prime mover 40, to thereby cause the generator 12 to assume more load. In like manner, the current flow through the control windings 160 and 156 of the magnetic amplifier 74 is in such a direction as to effect a decrease in the impedance of its load windings 140 and 138 to thereby increase the output of the magnetic amplifier 74, to thus effect an operation of the governor 84 in such a direction as to tend to increase the speed of the prime mover 42, to thereby cause the generator 14 to assume more load.

It is to be noted that an increase in the voltage across the series circuit, including the variable resistor 164 and the control windings 156 and 160 of the magnetic amplifier 46, effects a decrease in the voltage across the control windings 154 and 158 of the magnetic amplifier 60, and a decrease in the voltage across the control windings 154 and 158 of the magnetic amplifier 74. Thus, this action effects a further decrease in the impedance of the associated load windings 138 and 140, to thereby effect a further tendency to increase the speed of the prime movers 40 and 42, and thus cause their associated generators 12 and 14, respectively, to take a greater portion of the total load 16.

It is also to be noted that when the generator 10 assumes a greater proportion of the total load 16 than it should, to thereby increase the magnitude of the voltage appearing at the output of the load-sensing network 44, the magnitude of the current flow through the control windings 154 and 158 of the magnetic amplifier 46 is increased, to thereby effect an increase in the impedance of the load windings 138 and 140 of the magnetic amplifier 46, to thereby decrease the magnitude of the output of the magnetic amplifier 46, to thus effect an operation of the governor 56 in such a direction as to tend to decrease the speed of the prime mover 38, thereby decreasing the magnitude of the load assumed by the generator 10. Thus, no matter which of the generators 10, 12 or 14 assumes a greater portion of the load than they should, the control apparatus associated with the generators will effect a decrease in the loading on the generator or generators that are assuming a greater proportion of the load, and will increase the loading on the parallel connected generator or generators that are not assuming their proportionate amount of the total load.

It is to be understood that this invention can also be applied to three-phase generators as well as to single-phase generators, as illustrated.

The apparatus embodying the teachings of this invention has several advantages. For instance, it can be readily adapted to apply to either direct-current or alternating-current generators that are connected in parallel to a common load. Also, the apparatus embodying the teachings of this invention can be applied where paralleling a plurality of machines that drive a common mechanical load. Further, it is very flexible since the proportion of the load assumed by any of the generators connected in parallel can be readily varied by adjusting the resistors 164. For instance, if the value of the resistance of the resistor 164 is decreased, its associated generator will take a greater proportion of the total load 16. Further, additional generators with similar control apparatus can be readily connected in parallel circuit relationship with the generators 10, 12 and 14 without changing the circuitry of the control apparatus associated with the generators 10, 12 and 14.

Since certain changes may be made in the above-described apparatus and circuits, and different embodiments of the invention can be made without departing from the spirit and scope thereof, it is intended that all matter contained in the above description or shown in the accompanying drawing shall be interpreted as illustrative and not a limiting sense.

We claim as our invention:

1. In control apparatus for maintaining a proper division of load between a plurality of parallel connected generators each of which is driven by a separate prime mover, the combination comprising, a separate load-sensing circuit associated with each of the parallel connected generators for obtaining a measure of the load on the associated generator, a magnetic device for each of the parallel connected generators, each of the magnetic devices having an output, magnetic core means, and at least two control windings disposed in inductive relationship with the magnetic core means, the two control windings of each magnetic device being responsive to said measure of the load produced by its respective associated load-sensing circuit and so disposed on their respective magnetic core means that current flow through the two control windings produces magnetomotive forces that oppose one another, circuit means for connecting one of the two control windings of each magnetic device in parallel circuit relationship with one another, so that a change in the load on one of the parallel connected generators effects a change in the magnitude of the output of each of the magnetic devices, and separate control means associated with each of the prime movers for tending to change its speed, each of said separate control means being interconnected with the output of its respective magnetic device so as to respond to the change in the magnitude of the output of the respective magnetic device.

2. In control apparatus for maintaining a proper division of load between a plurality of parallel connected generators each of which is driven by a separate prime mover, the combination comprising, a separate load-sensing circuit associated with each of the parallel connected generators for obtaining at its output a measure of the load on the associated generator, a magnetic device for each of the parallel connected generators, each of the magnetic devices having an output, magnetic core means, and at least two control windings connected in series circuit relationship with one another and disposed in inductive relationship with the magnetic core means, said series circuit of each magnetic device being connected across the output of its associated load-sensing circuit and the two control windings of each magnetic device being so disposed on their respective magnetic core means that current flow through the two control windings produces magnetomotive forces that oppose one another, circuit means for connecting one of the two control windings of each of the magnetic devices in parallel circuit relationship with one another so that a change in the load on one of the parallel connected generators effects a change in the magnitude of the output of each of the magnetic devices, and separate control means associated with each of the prime movers for tending to change its speed, each of said separate control means being interconnected with the output of its respective magnetic devices so as to respond to the change in the magnitude of the output of the magnetic device.

3. In control apparatus for maintaining a proper division of load between a plurality of parallel connected generators each of which is driven by a separate prime mover, the combination comprising, a separate load-sensing circuit associated with each of the parallel connected generators for obtaining at its output a measure of the load on the associated generator, a magnetic device for each of the parallel connected generators, each of the magnetic devices having an output, a variable resistor, magnetic core means, and at least two control windings disposed in inductive relationship with the magnetic core means and connected in series circuit relationship with one another and with their associated variable resistor, the series circuit including the two control windings and the variable resistor being connected across the output of its associated load-sensing circuit and the two control windings of each magnetic device being so disposed on their respective magnetic core means that current flow through the two control windings produces magnetomotive forces that oppose one another, circuit means for connecting one of the two control windings of each of the magnetic devices in parallel circuit relationship with one another so that a change in the load on one of the parallel connected generators effects a change in the magnitude of the output of each of the magnetic devices, and separate control means associated with each of the prime movers for tending to change its speed, each of said separate control means being interconnected with the output of its respective magnetic device so as to respond to the change in the magnitude of the output of the magnetic device.

4. In control apparatus for maintaining a proper division of load between a plurality of parallel connected generators each of which is driven by a separate prime mover, the combination comprising, a separate load-sensing circuit associated with each of the parallel connected generators for obtaining a measure of the load on the associated generator, a magnetic device for each of the parallel connected generators, each of the magnetic devices having an output, magnetic core means, and a control winding disposed in inductive relationship with the magnetic core means, the control winding of each magnetic device being responsive to said measure of the load produced by its respective associated load-sensing circuit, circuit means for connecting the control windings of the magnetic devices in parallel circuit relationship with one another, and separate control means associated with each of the prime movers for tending to change its speed, each of said separate control means being interconnected with the output of its respective magnetic device so as to respond to the change in the magnitude of the output of the respective magnetic device.

5. In control apparatus for maintaining a proper division of load between a plurality of parallel connected generators each of which is driven by a separate prime mover, the combination comprising, a separate load-sensing circuit associated with each of the parallel connected generators for obtaining a measure of the load on the associated generator, a magnetic device for each of the parallel connected generators, each of the magnetic devices having an output, magnetic core means, and two control windings disposed in inductive relationship with the magnetic core means, the number of turns of one of the two control windings being greater than the number of turns of the other of the two control windings, the two control windings of each magnetic device being responsive to said measure of the load produced by its respective associated load-sensing circuit and so disposed on their respective magnetic core means that current flow through the two control windings produces magnetomotive forces that oppose one another, the magnetomotive force effected by the control winding having the greater number of turns being such as to tend to increase the magnitude of the output of its respective magnetic device, circuit means for connecting said control windings having the greater number of turns in parallel circuit relationship with one another so that a change in the load on one of the parallel connected generators effects a change in the magnitude of the output of each of the magnetic devices, and separate control means associated with each of the prime movers for tending to change its speed, each of said separate control means being interconnected with the output of its respective magnetic device so as to respond to the change in the magnitude of the output of the respective magnetic device.

6. In control apparatus for maintaining a proper division of load between a plurality of parallel connected generators each of which is driven by a separate prime mover, the combination comprising, a separate load-sensing circuit associated with each of the parallel connected generators for obtaining at its output a measure of the load on the associated generator, a magnetic device for each of the parallel connected generators, each of the magnetic devices having an output, a variable resistor, magnetic core means, and two control windings disposed in inductive relationship with the magnetic core means and connected in series circuit relationship with one another and with their associated variable resistor, the series circuit including the two control windings and the variable resistor being connected across the output of its associated load-sensing circuit and the two control windings of each magnetic device being so disposed on their respective magnetic core means that current flow through the two control windings produces magnetomotive forces that oppose one another, the number of turns of one of the two control windings being greater than the number of turns of the other of the two control windings and the magnetomotive force effected by the control winding having the greater number of turns being such as to tend to increase the magnitude of the output of its respective magnetic device, circuit means for connecting said control windings having the greater number of turns in parallel circuit relationship with one another so that a change in the load on one of the parallel connected generators effects a change in the magnitude of the output of each of the magnetic devices, and separate control means associated with each of the prime movers for tending to change its speed, each of said separate control means being interconnected with the output of its respective magnetic device so as to respond to the change in the magnitude of the output of the respective magnetic device.

References Cited in the file of this patent

UNITED STATES PATENTS

| | | |
|---|---|---|
| Re. 20,548 | Doyle | Nov. 9, 1937 |
| 1,863,302 | Geiselman | June 14, 1932 |
| 2,504,768 | Watson et al. | Apr. 18, 1950 |
| 2,636,132 | Stineman et al. | Apr. 21, 1953 |
| 2,643,345 | Almstrom et al. | June 23, 1953 |